(12) United States Patent
Minami et al.

(10) Patent No.: US 9,871,333 B2
(45) Date of Patent: Jan. 16, 2018

(54) AC GENERATOR SLIP RING DEVICE

(71) Applicant: Mitsubishi Electric Corporation, Tokyo (JP)

(72) Inventors: Shinichiro Minami, Tokyo (JP); Kazunori Tanaka, Tokyo (JP); Mitsuyasu Okamoto, Tokyo (JP)

(73) Assignee: Mitsbushi Electric Corporation, Tokyo (JP)

( * ) Notice: Subject to any disclaimer, the term of this patent is extended or adjusted under 35 U.S.C. 154(b) by 0 days.

(21) Appl. No.: 15/122,326

(22) PCT Filed: Jun. 18, 2014

(86) PCT No.: PCT/JP2014/066110
§ 371 (c)(1),
(2) Date: Aug. 29, 2016

(87) PCT Pub. No.: WO2015/193987
PCT Pub. Date: Dec. 23, 2015

(65) Prior Publication Data
US 2016/0372880 A1  Dec. 22, 2016

(51) Int. Cl.
H01R 39/00 (2006.01)
H01R 39/64 (2006.01)
(Continued)

(52) U.S. Cl.
CPC .......... *H01R 39/64* (2013.01); *H02K 13/003* (2013.01); *H02K 13/02* (2013.01)

(58) Field of Classification Search
CPC ......... H01R 39/64; H01R 39/00; H01R 39/08
(Continued)

(56) References Cited

U.S. PATENT DOCUMENTS 3,018,339 A * 1/1962 Smith .................... G04C 23/28
                                                        200/36
4,618,793 A * 10/1986 Shizuka ................ H01R 39/14
                                                        310/232
(Continued)

FOREIGN PATENT DOCUMENTS

JP   58-106333 U   7/1983
JP   2-152813 A    6/1990
(Continued)

OTHER PUBLICATIONS

International Search Report for PCT/JP2014/066110 dated Sep. 30, 2014.
(Continued)

Primary Examiner — Tulsidas C Patel
Assistant Examiner — Peter G Leigh
(74) Attorney, Agent, or Firm — Sughrue Mion, PLLC; Richard C. Turner

(57) ABSTRACT

An AC generator slip ring device including a shaft supported by a front and rear bracket, and a rotor on the inner circumferential side of a stator; a sleeve fixed to an end portion on the rear bracket side of the shaft; and a conductive ring retained on the outer circumferential side of the sleeve. The device also includes a partition ring on the outer circumferential side of the sleeve having one end portion fixed to the rear bracket and the other end portion has a first flange projected in the outer diameter direction; a second flange provided on the side opposite to the rear bracket of the sleeve, having an annular wall with a concave portion, the end surface of the annular wall opposing the first flange of the partition ring; and a flat portion formed on an outer circumferential portion of the annular wall of the second flange.

14 Claims, 5 Drawing Sheets

(51) Int. Cl.
*H02K 13/00* (2006.01)
*H02K 13/02* (2006.01)

(58) Field of Classification Search
USPC ............................. 439/23–27; 310/128, 232
See application file for complete search history.

(56) References Cited

U.S. PATENT DOCUMENTS

| | | | | |
|---|---|---|---|---|
| 5,001,378 | A * | 3/1991 | Miller | H02K 19/20 |
| | | | | 310/178 |
| 5,325,003 | A * | 6/1994 | Saval | H02K 1/243 |
| | | | | 310/232 |
| 5,327,037 | A * | 7/1994 | Rasmussen | H02K 3/528 |
| | | | | 310/232 |
| 5,459,364 | A * | 10/1995 | Rondier | H01R 39/14 |
| | | | | 310/232 |
| 5,486,732 | A * | 1/1996 | Rondier | H02K 13/02 |
| | | | | 310/232 |
| 5,521,450 | A | 5/1996 | Rondier | |
| 5,612,584 | A * | 3/1997 | York | H01R 39/08 |
| | | | | 310/232 |
| 6,876,111 | B2 * | 4/2005 | Kuroda | H02K 5/1732 |
| | | | | 310/90 |
| 7,990,016 | B2 * | 8/2011 | Herbold | H01R 39/14 |
| | | | | 29/597 |
| 8,786,150 | B2 * | 7/2014 | Minami | H02K 5/1732 |
| | | | | 310/90 |
| 2002/0171313 | A1 * | 11/2002 | Queener | H01R 43/10 |
| | | | | 310/232 |
| 2007/0257577 | A1 * | 11/2007 | Bizjak | H01R 39/14 |
| | | | | 310/232 |
| 2008/0315716 | A1 * | 12/2008 | Itoh | H02K 21/044 |
| | | | | 310/263 |

FOREIGN PATENT DOCUMENTS

| | | |
|---|---|---|
| JP | 3-265446 A | 11/1991 |
| JP | 3622118 B2 | 2/2005 |
| WO | WO 2015198446 A1 * 12/2015 | ............. H02K 19/22 |

OTHER PUBLICATIONS

Communication dated Apr. 25, 2017, issued from the Japan Patent Office in counterpart Japanese Application No. 2016-528707.

* cited by examiner

AC GENERATOR SLIP RING DEVICE

CROSS REFERENCE TO RELATED APPLICATIONS

This application is a National Stage of International Application No. PCT/JP2014/066110 filed Jun. 18, 2014, the contents of which are incorporated herein by reference in their entirety.

TECHNICAL FIELD

The present invention relates to, for example, a vehicular AC generator slip ring device, which is mounted on a vehicle such as a passenger car and a truck.

BACKGROUND ART

For example, as a conventional vehicular AC generator slip ring device, there is known one that is provided with a labyrinth configuration that is not contaminated by salty water, oil, dust, and the like. The slip ring device is a formed product in which a pair of metal rings (conductive rings) in which brushes slide and a pair of connection terminals electrically connected to the rings are molded (for example, see Patent Document 1).

Above all, there is shown one which has means in which a slip ring unit of a configuration in which each of a pair of connected connection elements is axially extended and embedded in an insulation material to be connected to a ring portion of the insulation material is fitted by press-fitting to a shaft of an alternator (for example, Patent Document 2).

Two outward projection portions radially opposite to each other are provided in a protruding condition at symmetrical positions at an angular distance of 90 degrees with respect to the connection member. A slightly recessed concavity is formed on the outer peripheral surface of the projection portion. This is an improvement in which a positioning is reliably performed during automatically fitting and grip and alignment of the slip ring units are further facilitated.

PRIOR ART DOCUMENT

Patent Document

[Patent Document 1] Japanese Unexamined Patent Publication No. H03(1991)-265446
[Patent Document 2] Japanese Patent Registration No. 3622118

SUMMARY OF THE INVENTION

Problems to be Solved by the Invention

In the aforementioned known AC generator slip ring device, the ring portion made of the insulation material is used as a place for grasping the slip ring device and accordingly the projection portion and its vicinity are possibly easily damaged depending on equipment. In the case of unseen damages in appearance, it is also conceivable that a failure is exposed after mounting the device on a vehicle and a problem becomes larger. Furthermore, the known slip ring device has the configuration that is excessively projected from the ring; and accordingly, a problem exists in that not only molding equipment but also equipment during assembly are increased in size.

Furthermore, although a circular through hole (1242) provided in Patent Document 2 has a role to perform a positioning of the connection element (metal) during molding process, a problem exists in that almost half thereof remains exposed and is in a state of being constantly exposed to a foreign substance contained in cooling wind from an adjacent fan.

The present invention has been made to solve the foregoing problem and is to provide an AC generator slip ring device which is high in durability and productivity without increasing in size of the device.

Means for Solving the Problems

According to the present invention, there is provided an AC generator slip ring device including: a shaft rotatably supported by a front bracket and a rear bracket, and having a rotor arranged on the inner circumferential side of a stator; a sleeve fixed to an end portion on the rear bracket side of the shaft; and a conductive ring retained on the outer circumferential side of the sleeve, and connected to an excitation coil of the rotor. The AC generator slip ring device is provided with: a partition ring which is provided on the outer circumferential side of the sleeve, and in which one end portion is fixed to the rear bracket and the other end portion has a first flange that is projected in the outer diameter direction; a second flange which is provided on the side opposite to the rear bracket of the sleeve, and has an annular wall that is formed with a concave portion so that the other end portion of the partition ring is positioned, the end surface of the annular wall being opposed to the first flange of the partition ring; and a flat portion formed on an outer circumferential portion of the annular wall of the second flange as a conveyance positioning.

Advantageous Effect of the Invention

According to the AC generator slip ring device of the present invention, the other end portion and the first flange of the Partition ring and the annular wall of the second flange form a labyrinth structure; and therefore, the occurrence of contamination of the conductive ring and a brush due to salty water or the like can be prevented and it also becomes possible to perform the conveyance positioning during component assembly supply without deteriorating the function and strength of the annular wall of the second flange by the flat portion that is formed on the outer circumferential portion of the annular wall of the second flange as the conveyance positioning. Furthermore, there can be obtained the AC generator slip ring device which can configure the device by more compact equipment and can reduce cost.

MODE FOR CARRYING OUT THE INVENTION

Embodiment 1

Figure 1:
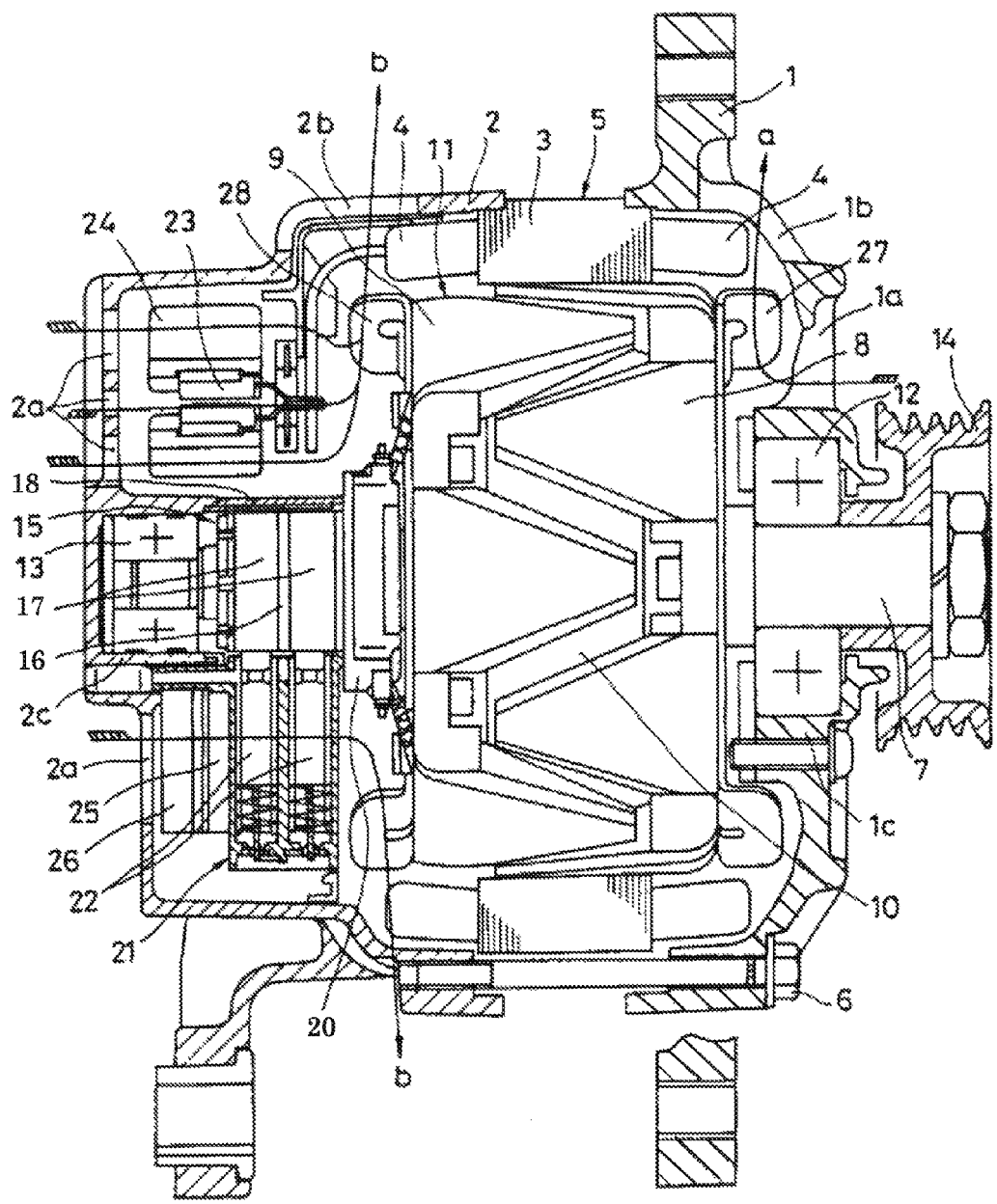
FIG. 1 is a sectional side view showing an AC generator according to Embodiment 1 of the present invention.
Figure 2:
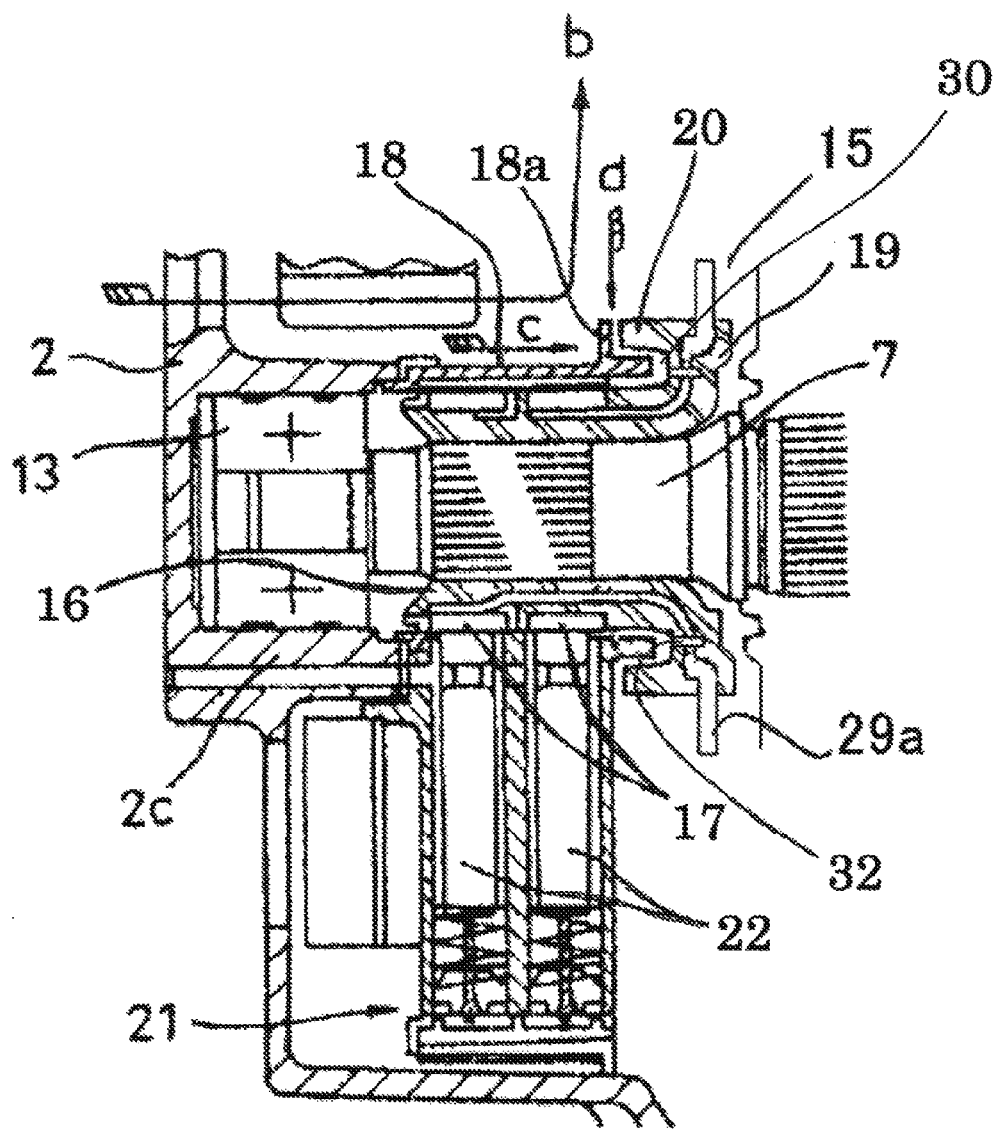
FIG. 2 is a sectional view showing an AC generator slip ring device portion according to Embodiment 1 of the present invention.
Figure 3:
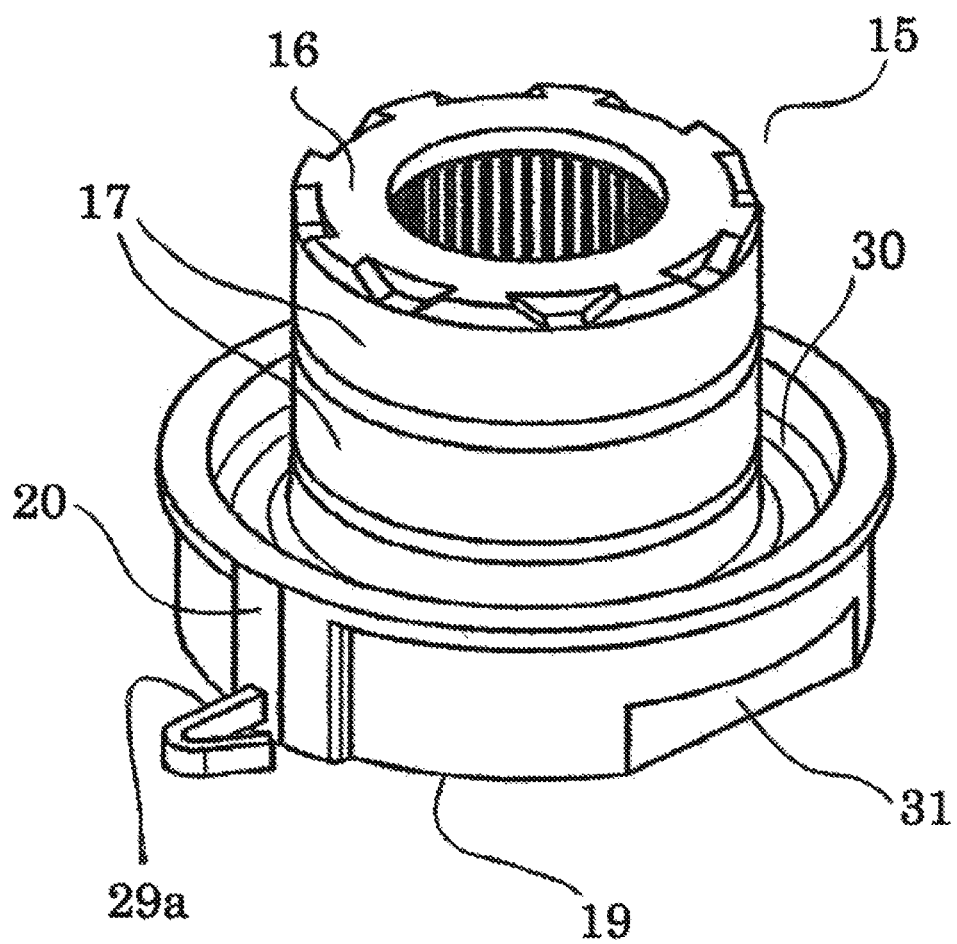
FIG. 3 is a perspective view showing an AC generator slip ring device according to Embodiment 1 of the present invention.

Hereinafter, Embodiment 1 of the present invention will be described with reference to FIG. 1 to FIG. 3. Then, in each of the drawings, identical or equivalent members and portions will be described with the same reference numerals (and letters) assigned thereto. FIG. 1 is a sectional side view showing an AC generator according to Embodiment 1 of the present invention. FIG. 2 is a sectional view showing an AC generator slip ring device portion according to Embodiment 1 of the present invention. FIG. 3 is a perspective view showing an AC generator slip ring device according to Embodiment 1 of the present invention.

For example, a vehicular AC generator in Embodiment 1 of the present invention includes: a bowl-shaped front bracket 1 which has a suction hole 1a and a discharge hole 1b and is provided with bearing cylinder 1c that are opened in axial both sides in end surface central portions; a bowl-shaped rear bracket 2 which has a suction hole 2a and a discharge hole 2b, is provided with a bearing cylinder 2c that is opened in an axial one direction in an end surface central portion, and is fitted to an opening portion of the front bracket 1; a stator 5 composed of a stator core 3 and a stator winding 4, the stator 5 being pressed and retained in a sandwich manner between the front bracket 1 and the rear bracket 2 by bolts 6; a shaft 7 having a rotor 11 composed of field pole cores 8, 9 and an excitation coil 10, which are positioned at intervals on the inner side of the stator 5; bearings 12, 13 that rotatably support the shaft 7 to the aforementioned bearing cylinder 1c, 2c, respectively, the shaft 7 being inserted to the front bracket 1 and the rear bracket 2; and a pulley 14 which is fixed to an external insertion end portion of the shaft 7 and is rotated by an engine (not shown in the drawing).

For example, a vehicular AC generator slip ring device 15 has: a resin-made sleeve 16 fixed to an end portion on the rear bracket side of the shaft 7; and a conductive ring 17 which is retained on the outer circumferential side of the sleeve 16 and is connected to the excitation coil 10 of the rotor 11. The slip ring device 15 is fixed to an end portion on the rear bracket side of the shaft 7. A partition ring 18 is provided on the outer circumferential side of the sleeve 16, one end portion is fixed to the rear bracket 2, and the other end portion has a first flange 18a that is projected in the outer diameter direction. A second flange 19 is integrally provided on the end surface on the side opposite to the rear bracket of the sleeve 16 and has an annular wall 20 that is formed with a concave portion 30 so that the other end portion of the partition ring 18 is positioned, the end surface of the annular wall 20 being opposed to the first flange 18a of the partition ring 18.

The covering partition ring 18 is configured such that one end portion is fixed to the rear bracket 2 and the other end portion is opposed to the annular wall 20 of the second flange 19 that is integrally provided on the side opposite to the rear bracket of the sleeve 16, thereby forming a labyrinth structure in the radial direction and the axial direction. With this configuration, a slidably connecting portion between the conductive ring 17 and a brush 22 (to be described later) is protected so as not to be contaminated by, for example, salty water, oil, or dust, and the occurrence of a conduction defect and/or a brush sliding defect can be prevented.

A brush device 21 has the brush 22 to be slidably connected to the conductive ring 17, and is provided around the slip ring device 15 via the partition ring 18, and is configured so as to magnetize the field pole cores 8, 9 through the conductive ring 17 and the excitation coil 10 of the rotor 11.

Furthermore, a rectifier 23 rectifies an AC current, which is induced in the stator coil 4 by the rotation of the field pole cores 8, 9, into a DC current. A heat sink 24 dissipates heat generated by the rectifier 23. A voltage regulator 25 detects an output voltage of the vehicular AC generator and regulates an output terminal voltage to a predetermined value by controlling an excitation current. A heat sink 26 dissipates heat generated by the voltage regulator 25. A fan 27 and a fan 28 are fixed to the end surfaces of the field pole cores 8, 9, respectively.

In the thus configured vehicular AC generator, if the fans 27, 28 rotate by the rotation of the shaft 7, cooling wind flows in the front bracket 1 from the suction hole 1a of the first bracket 1 as shown by an arrow "a" to cool the bearing 12, the field pole cores 8, 9, the excitation coil 10, the stator core 3, and the stator coil 4, and is discharged from the discharge hole 1b to the outside.

While at the same time, cooling wind flows in the rear bracket 2 from the suction hole 2a of the rear bracket 2 as shown by an arrow "b" to cool the bearing 13, the voltage regulator 24, the field pole cores 8, 9, the excitation coil 10, the stator core 3, and the stator coil 4, and is discharged from the discharge hole 2b to the outside.

When salty water, oil, or dust contained in the cooling wind moves along the outer circumference of the partition ring 18 by the flow, the movement thereof can be blocked by the first flange 18a portion which is formed on the end portion on the side opposite to the rear bracket 2 and is projected in the outer diameter direction. The end surface of the annular wall 20 of another second flange 19 that is integrally provided on the sleeve 16 of the slip ring device 15 is opposed to the end surface of the first flange 18a and thus a narrow axial labyrinth air gap is set. This configuration can block to enter the cooling wind from the radial direction and the axial direction.

On the other hand, a pair of flat portions 31 formed as a conveyance positioning is provided at base portions of outer circumferential portion of the annular wall 20 of the second flange 19 molded with resin. The flat portion 31 is provided in parallel to the extending direction of an external connection portion 29a of a connection terminal 29 which connects the excitation coil 10 of the rotor 11 and the conductive ring 17, and on the inner circumferential side than the outer circumferential surface of the annular wall 20 on the shaft 7 side. As shown in FIG. 3, the flat portion 31 is provided partially in the circumferential direction and only at the base portion of the annular wall 20 of the second flange 19; and therefore, the strength of the annular wall 20 is not reduced. Since projection to the outer side than an annular range is not made as in the aforementioned conventional example, not only a form of resin molding can be made small, but also a supply space may not need to be increased; and there exists no grasping process and therefore there is not a failure that is partially defective and production efficiency is enhanced. Furthermore, supply of the aforementioned slip ring devices 15 aligned in the same direction can be easily made only by providing parallel guides on a component conveying device during component supply for assembly of the AC generator.

Furthermore, a supporting portion 32 of the external connection portion 29a of the connection terminal 29 is provided to the concave portion 30 surrounded by the annular wall 20 of the second flange 19 and the outer circumference of the sleeve 16; and thus, it does not become a state where an exposed portion is exposed and is directly subjected to a foreign substance from the outside as in the aforementioned conventional configuration, but an exposed portion which is for avoiding deformation of the connection terminal 29 due to molding pressure during molding is not directly subjected to the outside and therefore a high endurance product can be achieved.

By the aforementioned configuration, salty water, oil, dust or the like contained in the cooling wind by the rotation of the fan does not reach and therefore the occurrence of contamination of the conductive ring and the brush can be prevented, the contamination being caused by the salty water or the like. Furthermore, the function of a component positioning during assembly is also provided without deteriorating the function of preventing the occurrence of contamination and failures such as a lack of the flange during assembly can be avoided.

Embodiment 2

Figure 4:
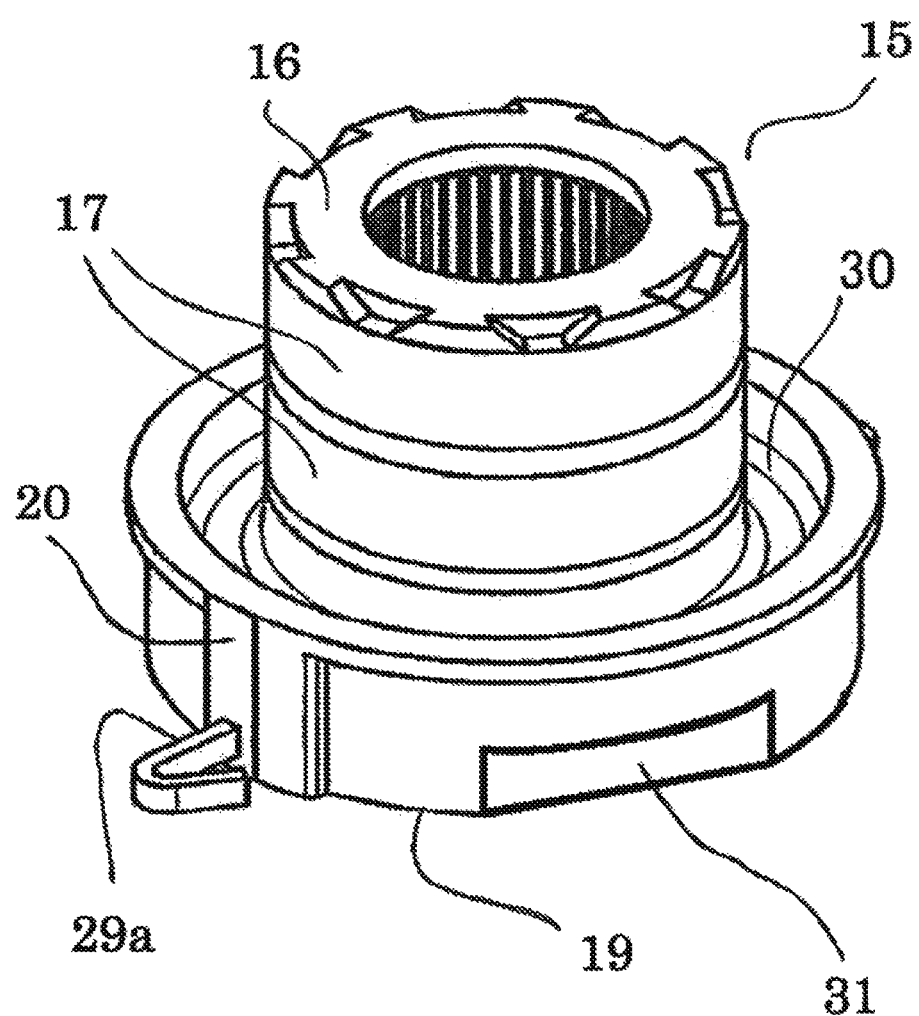
FIG. 4 is a perspective view showing an AC generator slip ring device according to Embodiment 2 of the present invention.
Figure 5:
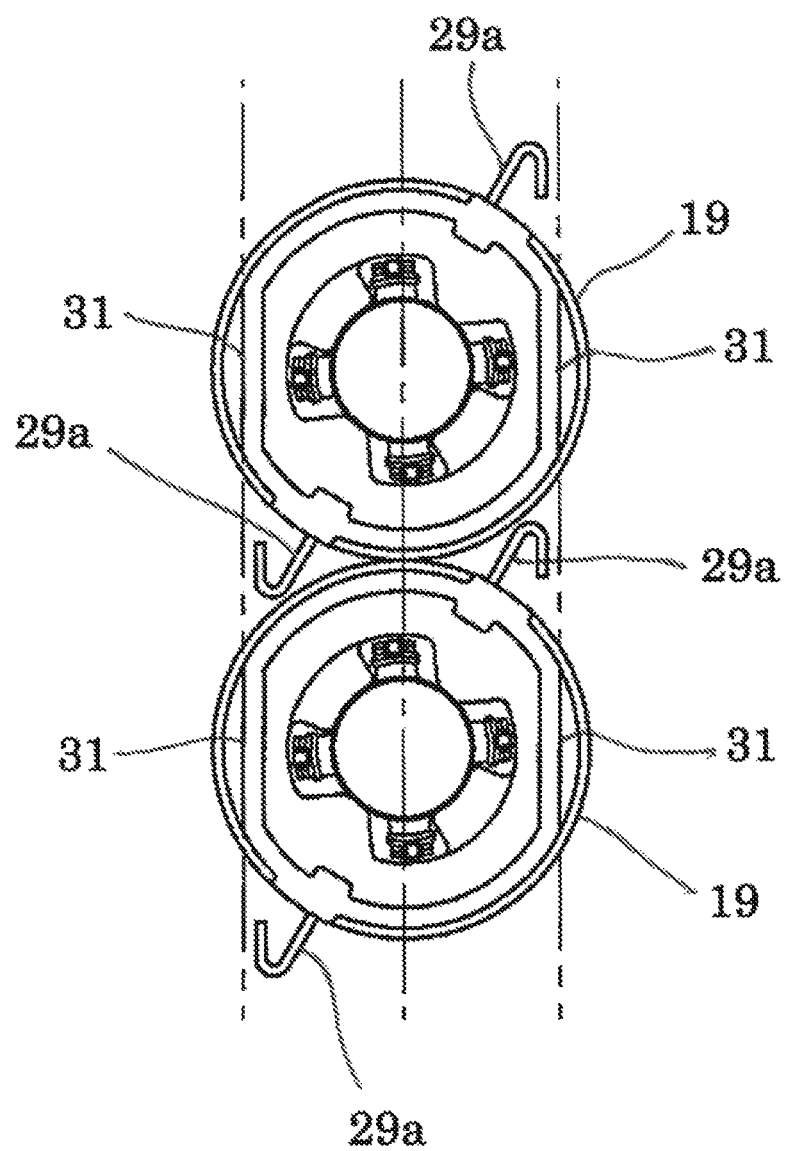
FIG. 5 is a plan view showing a state during conveyance of the AC generator slip ring device according to Embodiment 2 of the present invention.

Embodiment 2 of the present invention will be described with reference to FIG. 4 and FIG. 5. Then, each of the drawings, identical or equivalent members and portions will be described with the same reference numerals (and letters) assigned thereto. FIG. 4 is a perspective view showing an AC generator slip ring device according to Embodiment 2 of the present invention. FIG. 5 is a plan view showing a state during conveyance of the AC generator slip ring device according to Embodiment 2 of the present invention.

In the aforementioned Embodiment 1, the description has been made on the case where a pair of the flat portions 31 formed as the conveyance positioning is provided at base portions of the outer circumferential portion of the annular wall 20 of the second flange 19 in parallel to the extending directions of the external connection portions 29a of the connection terminals 29 which connect the excitation coil 10 of the rotor 11 and the conductive ring 17. However, Embodiment 2 shows a permissible case even when the flat portions are not parallel to the extending directions of the external connection portions 29a. For example, as shown in FIG. 4 and FIG. 5, if an angle of a flat portion 31 is set at a proper value with respect to the extending direction of an external connection portion 29a, the external connection portions 29a of slip ring devices which are adjacent in the case of being aligned during conveyance are possible so as not to be brought into contact with each other. The external connection portions 29a are connected to coils in a post-process and therefore unnecessary interference of external terminal portions is avoided; and thus, the shape of the external connection portions 29a is stable and high quality is maintained. Furthermore, in this case, an interval at the time when the slip ring devices are aligned becomes small; and therefore, it becomes possible to efficiently convey and an improvement in productivity can be expected.

Incidentally, the aforementioned embodiments are one example and there is no problem even when components that constitute the vehicular AC generator are other normal components. Also as for the slip ring device, the size thereof, for example, the shape of the external connection terminal is not limited to the aforementioned configuration.

Furthermore, in the aforementioned embodiments, the description has been made on the vehicular AC generator slip ring device; however, the present invention can also be applied to a rotor of an AC generator for other than a vehicle, for example, for an outboard.

Incidentally, the present invention can freely combine the respective embodiments and appropriately modify and/or omit the respective embodiments, within the scope of the present invention.

INDUSTRIAL APPLICABILITY

The present invention is suitable to actualize an AC generator slip ring device which is high in durability and productivity without increasing in size of the device.

The invention claimed is:

1. An AC generator slip ring device comprising:
a shaft rotatably supported by a front bracket and a rear bracket, and having a rotor arranged on the inner circumferential side of a stator;
a sleeve fixed to an end portion on the rear bracket side of said shaft; and
a conductive ring retained on the outer circumferential side of said sleeve, and connected to an excitation coil of said rotor,
wherein said AC generator slip ring device is provided with:
a partition ring which is provided on the outer circumferential side of said sleeve, and in which one end portion is fixed to said rear bracket and the other end portion has a first flange that is projected in the outer diameter direction;
a second flange which is provided on the side opposite to said rear bracket of said sleeve, and has an annular wall that is formed with a concave portion so that the other end portion of said partition ring is positioned, the end surface of the annular wall being opposed to said first flange of said partition ring; and
a flat portion formed on an outer circumferential portion of the annular wall of said second flange as a conveyance positioning,
wherein the flat portion is provided only at a base portion of the annular wall of said second flange.

2. The AC generator slip ring device according to claim 1, wherein the flat portion is provided on the inner circumferential surface side than the outer circumferential surface of the annular wall of said second flange.

3. The AC generator slip ring device according to claim 2, wherein the flat portion is provided in parallel to the extending direction of an external connection portion.

4. The AC generator slip ring device according to claim 3, wherein the concave portion is provided with a supporting portion that supports an external connection portion of a connection terminal.

5. The AC generator slip ring device according to claim 2, wherein the flat portion is not parallel to the extending direction of an external connection portion.

6. The AC generator slip ring device according to claim 5, wherein the concave portion is provided with a supporting portion that supports an external connection portion of a connection terminal.

7. The AC generator slip ring device according to claim 2, wherein the concave portion is provided with a supporting portion that supports an external connection portion of a connection terminal.

8. The AC generator slip ring device according to claim 2, wherein the flat portion is provided obliquely to the extending direction of an external connection portion.

9. The AC generator slip ring device according to claim 1, wherein the flat portion is provided in parallel to the extending direction of an external connection portion.

10. The AC generator slip ring device according to claim 9, wherein the concave portion is provided with a supporting portion that supports an external connection portion of a connection terminal.

11. The AC generator slip ring device according to claim 1, wherein the flat portion is not parallel to the extending direction of an external connection portion.

12. The AC generator slip ring device according to claim 11, wherein the concave portion is provided with a supporting portion that supports an external connection portion of a connection terminal.

13. The AC generator slip ring device according to claim 1, wherein the concave portion is provided with a supporting portion that supports an external connection portion of a connection terminal.

14. The AC generator slip ring device according to claim 1, wherein the flat portion is provided obliquely to the extending direction of an external connection portion.

\* \* \* \* \*